US008272283B2

(12) United States Patent
Vafaey

(10) Patent No.: US 8,272,283 B2

(45) Date of Patent: Sep. 25, 2012

(54) METHOD AND SYSTEM FOR VIBRATING AN OBJECT USING CENTRIFUGAL FORCE

(76) Inventor: Hossain Vafaey, Tehran (IR)

( * ) Notice: Subject to any disclaimer, the term of this patent is extended or adjusted under 35 U.S.C. 154(b) by 556 days.

(21) Appl. No.: 12/464,880

(22) Filed: May 13, 2009

(65) Prior Publication Data

US 2009/0223323 A1 Sep. 10, 2009

Related U.S. Application Data

(63) Continuation-in-part of application No. 12/036,317, filed on Feb. 25, 2008, now abandoned.

(51) Int. Cl.
*F03G 3/00* (2006.01)

(52) U.S. Cl. ........................................................ 74/84 S

(58) Field of Classification Search .................. 74/84 S, 74/86, 87
See application file for complete search history.

(56) References Cited

U.S. PATENT DOCUMENTS

2007/0295164 A1 12/2007 Tavarez

*Primary Examiner* — Alicia Torres

(74) *Attorney, Agent, or Firm* — Barry Choobin; Choobin & Choobin Consultancy

(57) ABSTRACT

Disclosed is a method and a system for vibrating an object using centrifugal forces, wherein the centrifugal forces are achieved from a rotating device and wherein the centrifugal forces comprise a positive force and a negative force. A linear motion is added to the rotating device thereby inverting the negative force of the centrifugal forces to a positive force.

2 Claims, 14 Drawing Sheets

METHOD AND SYSTEM FOR VIBRATING AN OBJECT USING CENTRIFUGAL FORCE

CROSS REFERENCE TO RELATED APPLICATION

This application is a continuation in part, and claims priority of U.S. patent application Ser. No. 12/036,317 filed on Feb. 25, 2008 now abandoned.

FIELD OF THE INVENTION

The present invention relates to a system and method for vibrating an object using a centrifugal force and, more particularly, to a system and method for vibrating an object associated with a rotating device wherein said force is employed to vibrate the object in different directions in air, space, sea, orbit, caves, railway and ground.

SUMMARY OF THE INVENTION

Principles of the present invention, as embodied and broadly described herein, provide centrifugal force to vibrate an object in a predetermined direction. The present invention among others employs $f_z=m \cdot r \cdot w^2$ wherein $f_z$ is the centrifugal force, r is the radius and $w^2$ is the angular velocity.

In the preferred embodiment, the present invention comprised of a mechanism that involves rotation of a device which creates centrifugal force and linear motion, wherein said centrifugal force comprises a positive force and a negative force. A linear motion is added to said rotating device thereby inverting said negative force of said centrifugal forces to a positive force.

Yet in another embodiment, the present invention discloses a system in which any mass which is deviated from the center of a rotating mechanism with an angular velocity will create a force away from the center of the rotation.

In another embodiment, the present invention discloses a system in which the centrifugal force are obtained by moving masses along a looped track or outer shell by means of applying an extrinsic force for example by reaction force jet nuzzles to the masses. Any mass which is deviated from the center of a rotating mechanism with an angular velocity will create a force away from the center of the rotation.

In another embodiment, the present invention discloses a system for vibrating an object, said system comprising of: at least one base which is attached to said object; at least one disc; at least one motor; at least one shaft wherein said at least one shaft rotates continuously said at least one disc at center of said disc; at least one mass slider wherein said at least one mass slider slides at least one mass which is fixed to said at least one mass slider through opening slot within said at least one disc free of friction with said opening slot, thereby producing centrifugal force wherein said centrifugal force comprises positive force and negative force; at least one jet nozzle wherein said at least one jet nozzle is attached to said at least one mass and wherein said jet nozzle releases a predetermined amount of reaction force to move said at least one mass; at least one hinge; at least one magnet wherein said at least one magnet is fixed to said at least one mass slider; at least one outer shell being fixed to said at least one base wherein said at least one outer shell comprises engraved pattern and at least one magnet, wherein said at least one magnet being fixed to said at least one mass slider and said at least one outer shell establish position of said mass slider wherein said position of said mass slider establishes force level of said centrifugal force, wherein said centrifugal force is at its maximum force level when said at least one mass slider is at maximum distance from said center of disc and said centrifugal force is at its minimum force level when said at least one mass slider is at minimum distance from said center of disc, and wherein said at least one shaft which rotates said at least one disc continuously produces a unidirectional force, thereby vibrating said object.

In another embodiment, the present invention discloses a system for vibrating said object in air, space, sea, orbit, caves, railway, and ground.

In another embodiment, the present invention discloses a system in which at least one mass slider is air cushioned and free of friction with said outer shell, thereby minimizing noise level.

In another embodiment, the present invention discloses a system for vibrating an object comprising: a base; at least one outer shell (19) wherein said outer shell comprises at least one looped track wherein said looped track comprises a path and a surface; at least one mass (15); at least one jet nozzle wherein said at least one jet nozzle is attached to said at least one mass and wherein said jet nozzle releases a predetermined amount of reaction force to move said at least one mass independently along the path of said at least one looped track; a first plurality of magnets (16) wherein said plurality of magnets are attached to said at least one mass; a second plurality of magnets wherein said second plurality of magnets are placed at said surface of said at least one looped track, wherein said at least one mass travels along the path of said at least one looped track by reaction force generated by said at least one jet nozzle, where physical contact between said mass and said surface of said looped track is eliminated.

In another embodiment the present invention discloses a method for vibrating an object comprising steps of: a) Obtaining a reaction force having a first direction and second direction wherein said reaction force is generated by at least one jet nozzle having a predetermined level of input energy, wherein said at least one jet nozzle and is attached to at least one mass, and wherein said reaction force causes said at least one mass to travel along a path on a looped track; b) Placing a plurality of magnets on surface of said looped track; c) Attaching a plurality of magnets to said at least one mass; d) Controlling direction of said reaction force by rotating said at least one jet nozzle (22) around the axis perpendicular to said at least one mass; e) Controlling magnitude of said reaction force by adjusting said predetermined level of input energy; f) Applying said reaction force to said at least one mass wherein said forces causes said at least one mass to travel along the path on a looped track; g) Producing centrifugal force wherein said centrifugal force comprises positive force and negative force; h) Eliminating said negative force employing steps d and e; and i) Repeating steps a, d, e, f, g and h to vibrate said object.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE INVENTION

Figure 1:
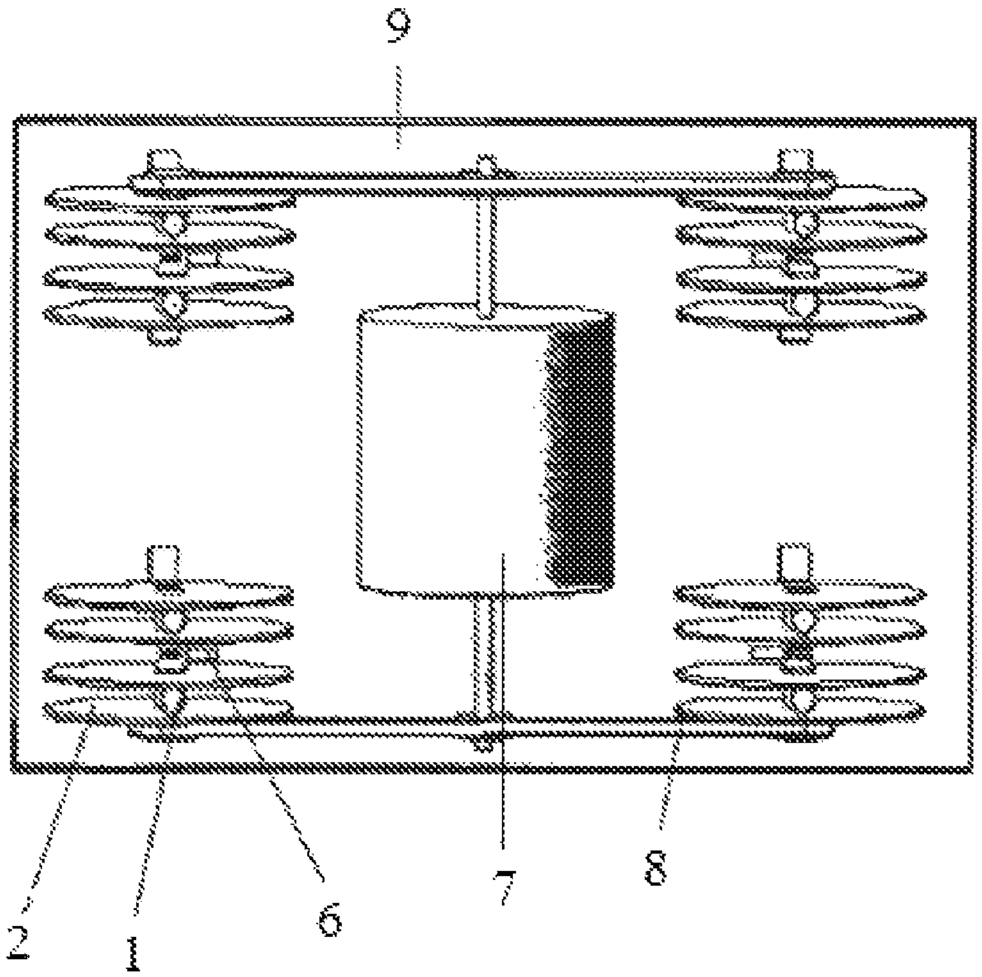
FIG. 1 is the top view of the mounted apparatus.
Figure 2:
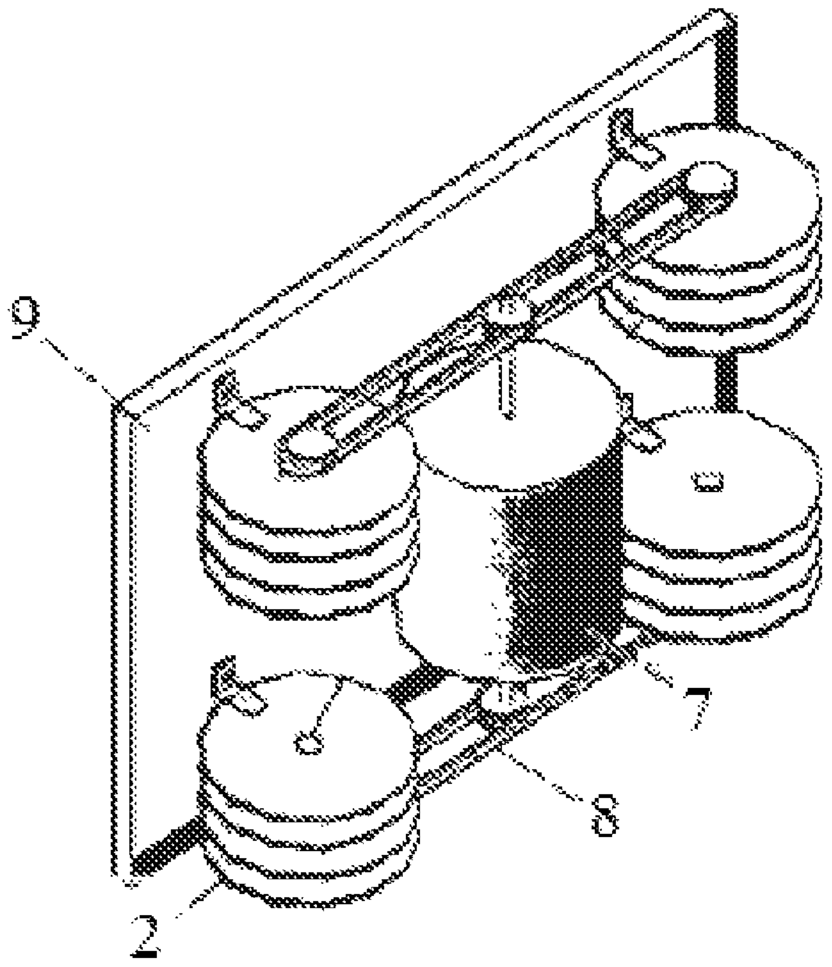
FIG. 2 is the perspective view of the mounted apparatus.

As shown in FIG. 1 and FIG. 2, the top view and perspective view respectively of the present invention comprises a chassis (9) which is attached to an object; at least one disc (2); at least one belt (8); at least one motor (7) and mass balls and cone gears (6) which are fixed to rotating shaft.

Figure 3:
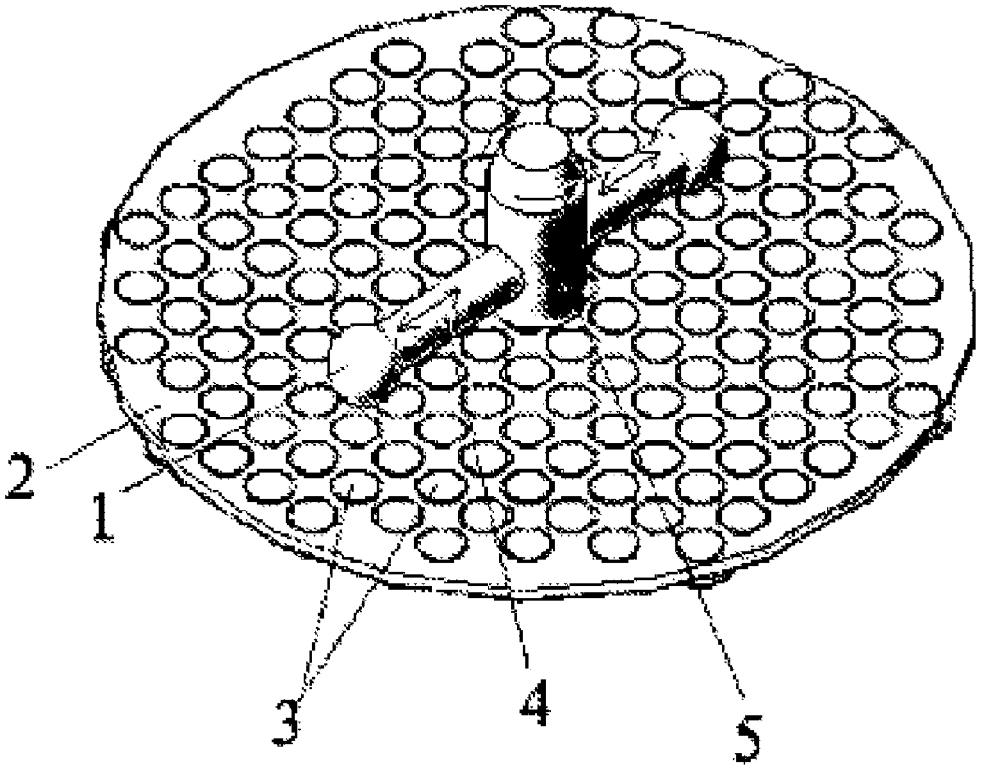
FIG. 3 shows the main mechanism of the rotation and sliding shaft at neutral point.

FIG. 3 illustrates the rotating part (5) which has a sliding shaft (4) which moves in and out of the rotating part (5), at both ends of the rotating shaft (4) two mass (1) are fixed. The perforated disk (2) has a large number of electro magnetic cells (3) (bobbins) which control the mass (1) position during the rotation and causes the inversion of the negative force or minimum force level of the rotating device to a positive force or maximum force level, thereby producing a unidirectional force to vibrate an object.

Referring back to FIG. 3, a rotating part (5) and sliding shaft (4) which slides in and out of the rotating part (5) creates centrifugal force which comprises negative force and positive force.

Figure 4:
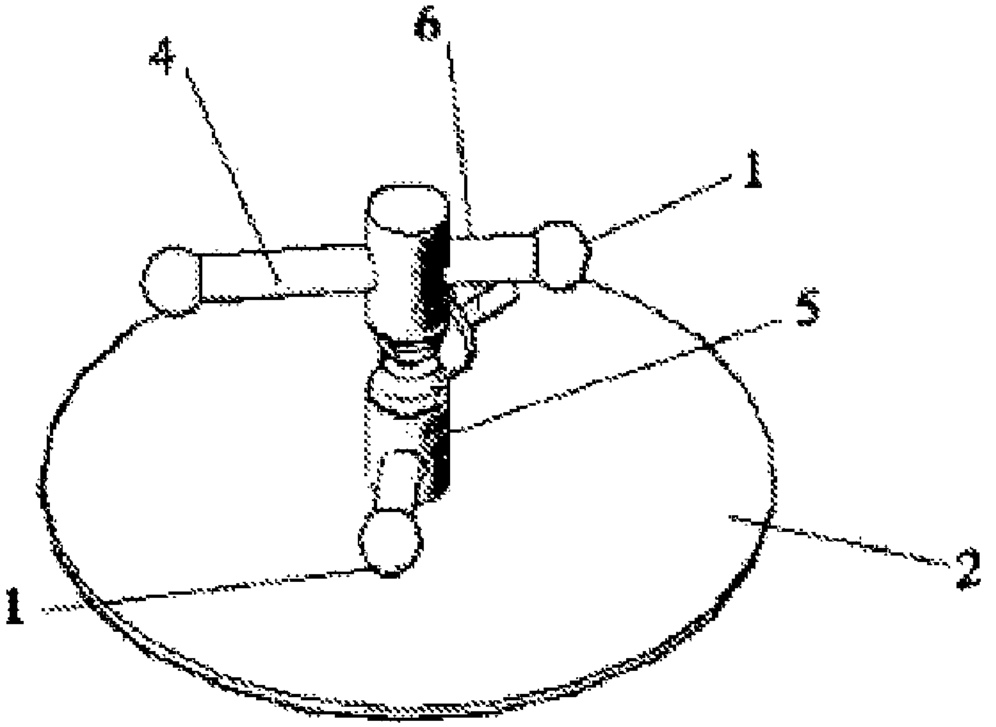
FIG. 4 shows the perspective view of the main mechanism of the rotation and sliding shaft in pairs and counter relative direction after 45 degrees rotations.

FIG. 4 shows 45 degrees rotation for both rotating mechanisms in their directions and also shows the sliding shafts (4) are lifted up.

Figure 5:
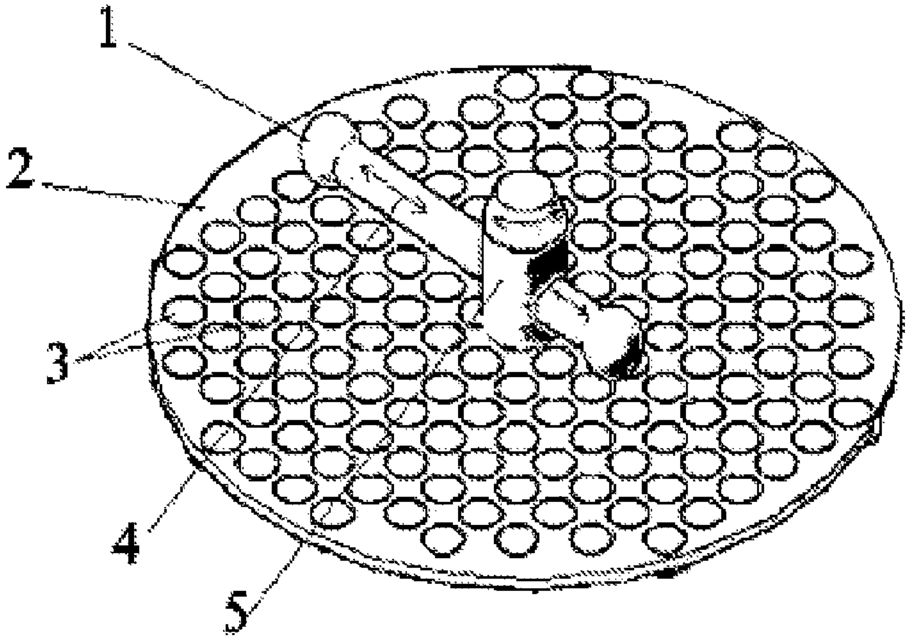
FIG. 5 shows the Perspective view of the main mechanism of the rotation and sliding shaft after 90 degrees rotation which the sliding shaft has been lifted up.
Figure 7:
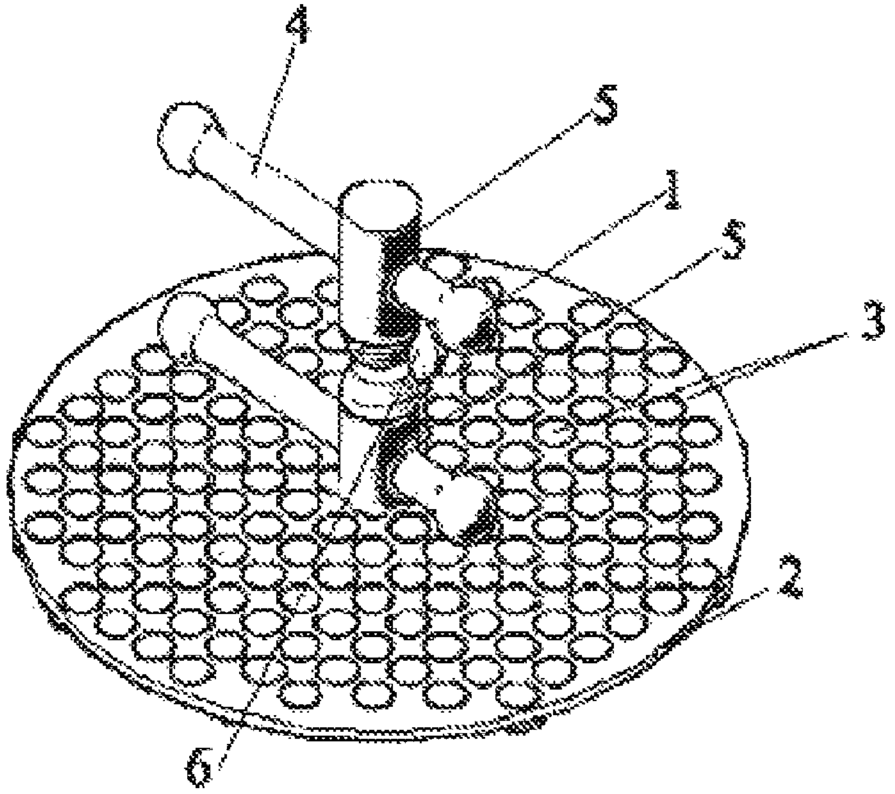
FIG. 7 shows the perspective view of the main mechanism of the rotation and the sliding shaft in pairs and counter rotation direction after 90 degrees rotations which both sliding shafts have been lifted up.

FIG. 7 shows another 45 rotation prior to the FIG. 4 which shows both sliding shafts (4) lifted up words in the same direction and extended in lengths in comparison to its opposite slide from the rotating part. And as further illustrated in FIG. 5 rotating part and sliding shaft continue up to 90 digress rotation causing the sliding shaft (4) to be directed extrinsically and to be increased in length, thereby, inverting the negative force from the opposite side of the shaft to positive force. Furthermore, the electro magnetic cells (3) (bobbins) are magnetized and demagnetized to control the position of the sliding shaft (4). This cycle continues up to 180 degrees rotation of rotating part and sliding shaft, thereby positioning the sliding shaft to its original position as shown in FIG. 3. Referring again back to FIG. 3 which shows a first side of sliding shaft and a second side of sliding shaft (4) having the same length from the rotating part (5) which is in neutral point.

Now back to fig (5), which shows the present invention system after rotating part and sliding shaft being rotated 90 degrees where the sliding shaft (4) has been lifted up words at a first side and the distance between mass ball of said first side (4) to said rotation part is changed in the manner that length of said first side of said sliding shaft is larger than length of a second side of said sliding shaft, thereby producing centrifugal force which is directed extrinsically. Again after 90 degrees rotation the system is back to the position in FIG. 3 which is in the neutral point, and eventually this cycle continues and at high RPM it can be created sufficient force to vibrate the object. The sliding shafts (4) positioning during the rotation can be controlled either mechanically which is shown in FIG. 8 or by means of electro magnetic cells which is controlled by a C.P.U.

Figure 6:
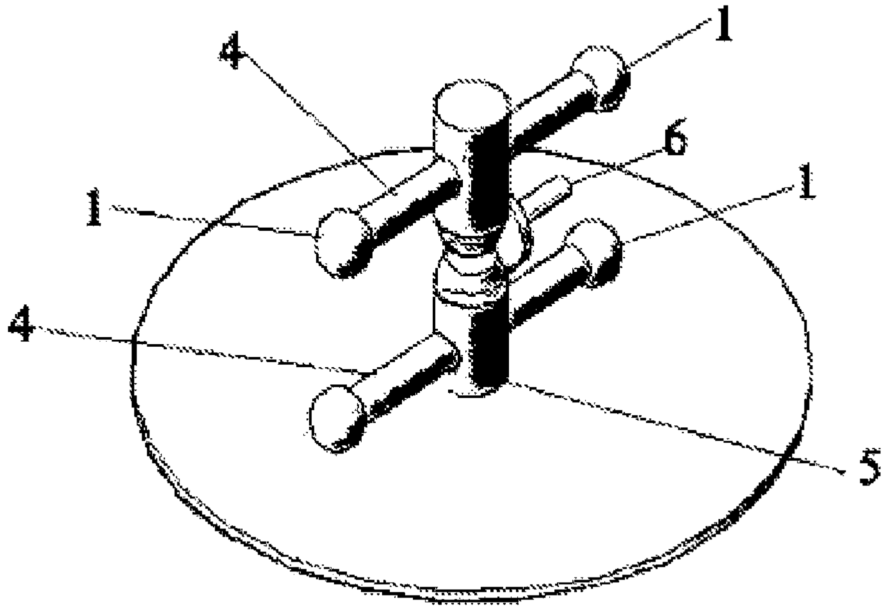
FIG. 6 shows the perspective view of the main mechanism of the rotation and sliding shaft in pairs and counter rotation direction.

FIG. 6 shows two rotating devices, wherein said devices rotate in opposite direction of each other by means of cone gears. In FIG. 6 both rotating devices are in neutral position. FIG. 4 shows 45 degrees rotation for both rotating devices in their directions and also shows the sliding shafts (4) which are lifted up.

FIG. 7 shows another 45 rotation prior to the FIG. 4 and shows both sliding shafts (4) which lifted up words in the same direction and extended lengths in comparison to its opposite side from the rotating part. This cycle also repeat itself to create a uni-directional force which is the resultant of the two rotating devices (shaft) (4) and rotating parts (5), in one direction generally. We gain a uni-direction force from an unbalanced rotating device (centrifugal force) which the opposite side of this un-balanced rotation is again inverted to the needed direction by sliding the shafts (4) or other means through the rotating part (5) and by utilizing a second rotating device and countering its rotation we can achieve a resultant force unidirectional. This force can finally be used to vibrate objects in the designed direction and over come gravity force to lift the object off the ground vertically, and again by using a number at such mechanism and mounting it to the chassis in different angles and direction; we can obtain all 3 dimension movements needed to vibrate an object. This mechanism can operate by electrical means and does not necessary require hydro carbon fuels. If the shafts (4) position is controlled by electromagnetic means then this mechanism produces a low level noise which is not disturbing.

Figure 8:
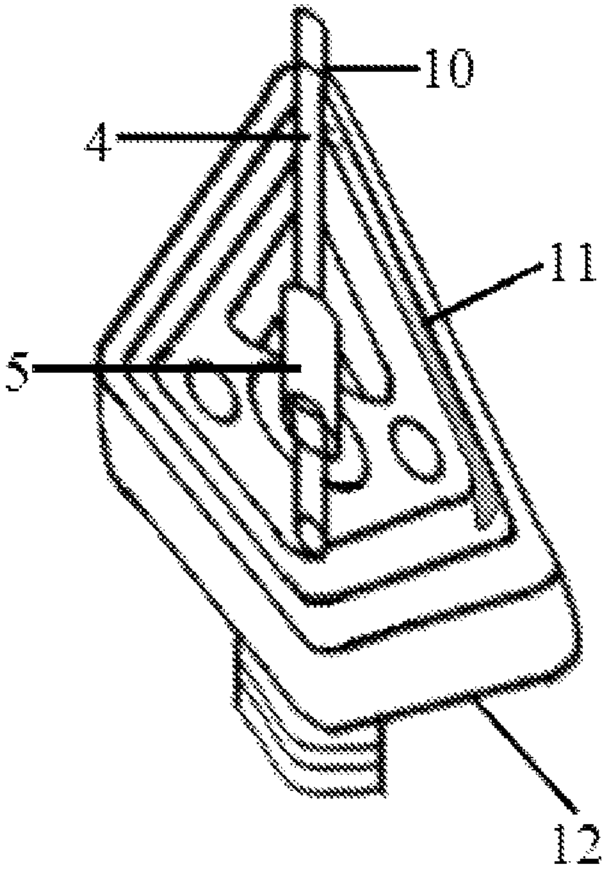
FIG. 8 shows the perspective view of the rotation and sliding shaft using mechanical means to control the position of the sliding shaft during rotation.

FIG. 8 represents the mechanical way of achieving the above mentioned rotation and sliding pattern where as the ball bearing (10) is driven in side the slot (11) of the mounted piece (12) and the sliding shafts (4) position against the rotation part (5) is controlled via mechanical means.

Figure 9:
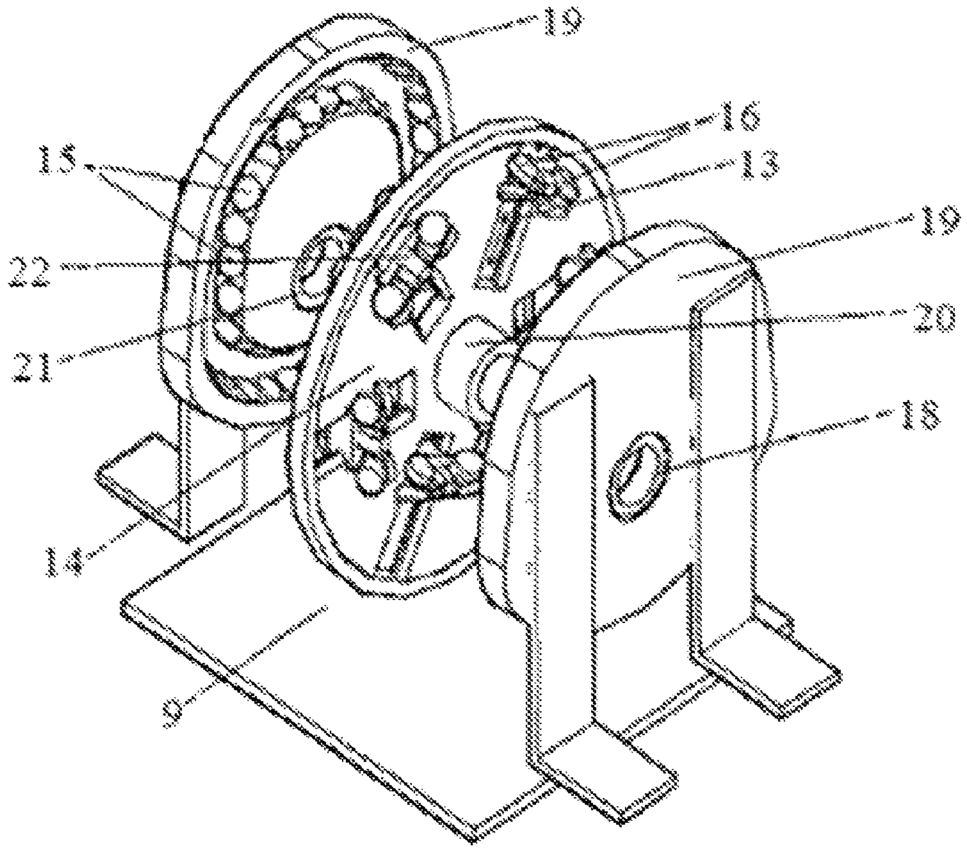
FIG. 9 shows the perspective view of the rotating disc which has a number of mass sliders sliding up and down the slots made in the disc and the outer shells are designed to position the sliders during rotation by means of magnetism to avoid physical touch between slider parts and outer shells.

FIG. 9 illustrates another method of achieving said rotation and centrifugal force by rotating a disc (14) and sliding the masses (15) up and down the disc's slots (13) in a linear motion which is positioned by using magnetism and keeping the mass sliders air cushioned and free of friction with the disc (14) in designed position by engraving the outer shells (19) and placing either permanent magnets (17) or coils to create magnetic field in either south or north pole. Mass sliders also have permanent magnets (16) attached to them and can bend around the corners by means of hinges (21). The shaft (20) is then rotated by means of an electric motor or other means which eventually rotates the rotating disc (14) and is also placed inside the ball bearings (18) and the outer shells (19). By using this mechanism, the masses (15) slides up and down (linear motion) the slots (13) of the disc (14) in the designed path which is engraved inside the outer shells (19) during the rotation and resulting in creation of uni-directional force since the unbalanced disc (14) is constantly shifting the opposite mass to the one desired direction.

Also by using permanent magnets (or coils) (16) and (17) in both outer shells (19) and mass sliders and by having same polarity we can create repelling forces which will result in keeping the mass sliders free of friction with the outer shell (19) and air cushioned (15) in position with the outer shells (19) during rotation without any physical touch, i.e result in low noise level.

Figure 10:
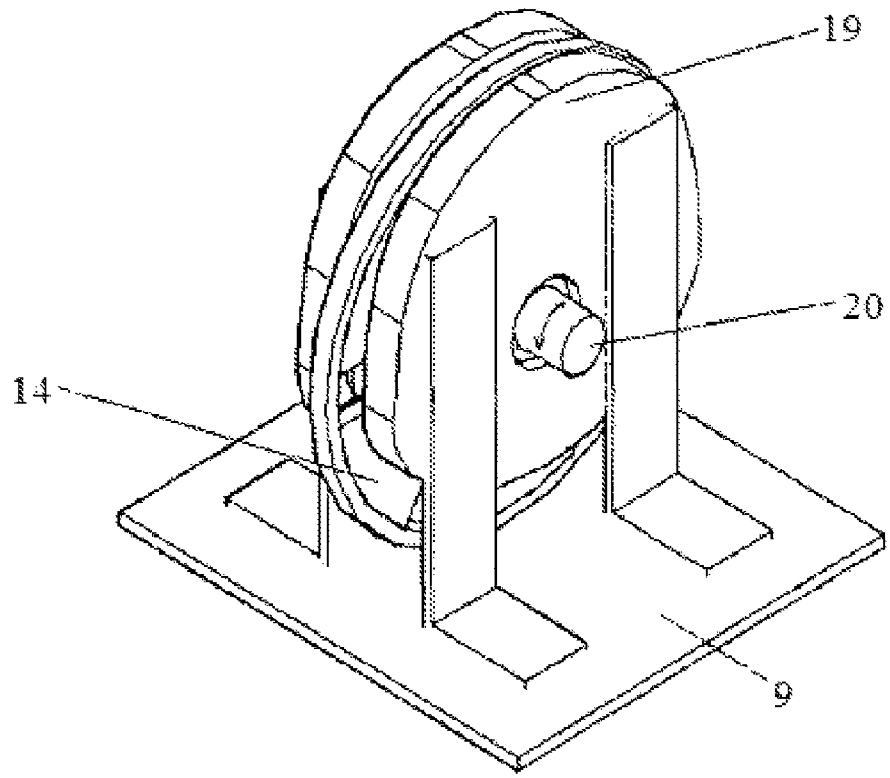
FIG. 10 shows the perspective view of the pieces shown in FIG. 9 as a whole embodiment assembled.

FIG. 10 shows the whole embodiment of the pieces shown in FIG. 9 mounted together and placed on a chassis (9). The shaft (20) is ready to be coupled to an electric motor.

Figure 11:
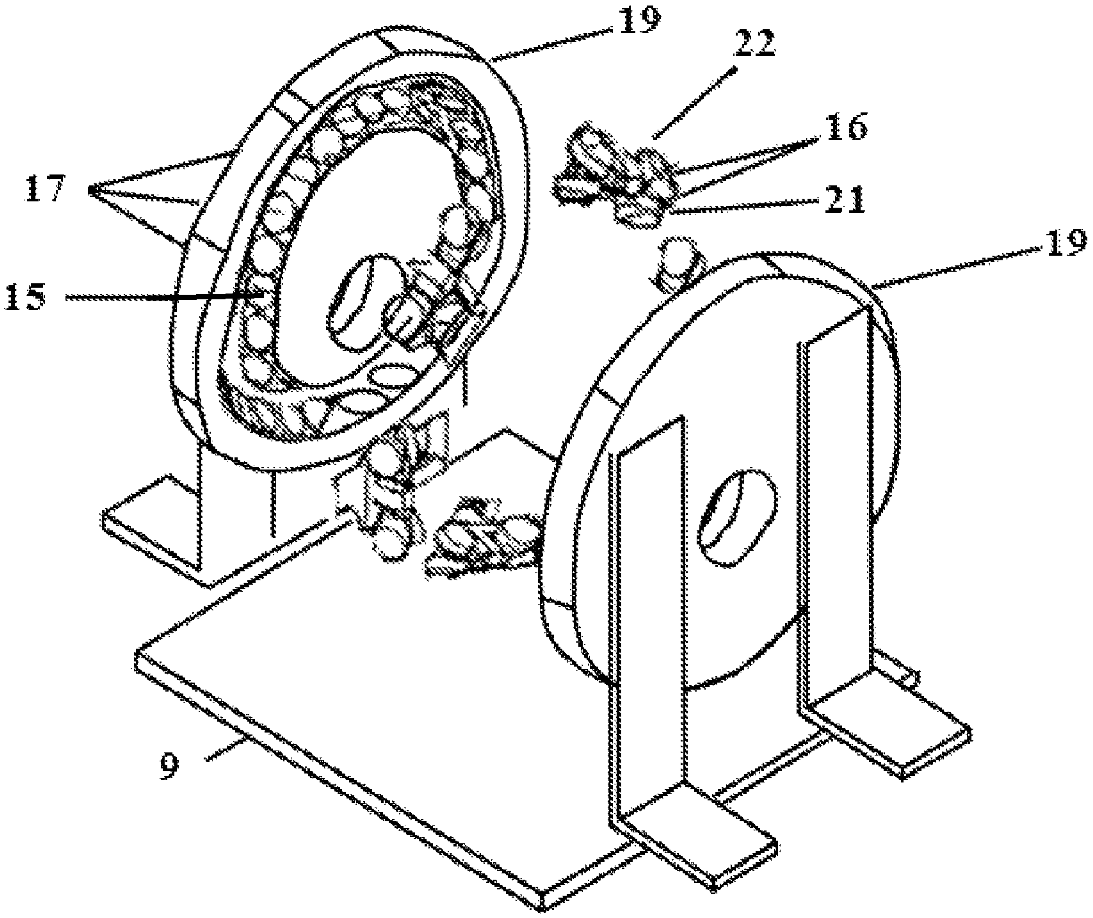
FIG. 11 shows the perspective view of the looped track which has a number of masses moving independently along the looped track by way of reaction force for example jet nozzles (22) and the looped track or outer shell are designed to positions the masses during their movement along the looped track by means of a plurality of magnets to avoid physical contact between masses and the looped track or other shell.

FIG. 11 illustrates the present invention wherein, comprises a base; at least one outer shell (19); a plurality of masses (15); at least one jet nozzle wherein said at least one jet nozzle is attached to said at least one mass, jet nozzle by releasing a predetermined amount of reaction force move masses independently along the path of the looped track or outer shell; a plurality of magnets (16) attached to said masses; a plurality of magnets positioned at the inside of the outer shell along the path of the looped track, wherein said masses travel along the path of said looped track or inside of the outer shell by reaction force generated by said jet nozzle, where physical contact between said masses and the surface of inside of said looped track is eliminated due to magnetic field generated by magnets.

Back to FIG. 11, which illustrates a method of achieving centrifugal force by moving masses (15) along a looped track or outer shell (19) by means of applying extrinsic force for example by jet nozzle (22) to the masses (15) independent of the outer shell (19) which is positioned by using magnetism and keeping the masses (15) air cushioned and free of friction with the looped track or outer shell (19) in designed position by engraving the outer shell (19) and placing either permanent magnets (16) (17) or coils to create magnetic field in either south or north pole. Masses (15) also have permanent magnets (16) attached to them and can bend around the corners by means of hinges (21). An extrinsic force is applied to the masses (15) for example by means of jet nozzles (22) or any other means which is independent of the outer shell (19) and magnitude of the extrinsic force applied to the masses (15) is controlled, also its direction is to be controlled by means of rotating the jet nozzles (22) around the axis perpendicular to the base plate of its fixture to masses (15). By monitoring the masses (15) position along the outer shell (19) through sensors and controlling the magnitude and direction of the extrinsic force applied to the masses (15) via a central processing until a unidirectional force is achieved which vibrates the embodiment.

Also by using permanent magnets (or coils) (16) and (17) in both outer shells (19) and masses (15) and by having same polarity we can create repelling forces which will result in keeping the masses (15) in position and free of friction with the outer shell (19) (air cushioned) during the movement of masses (15) along the outer shell (19), i.e. result in low noise level.

Figure 12:
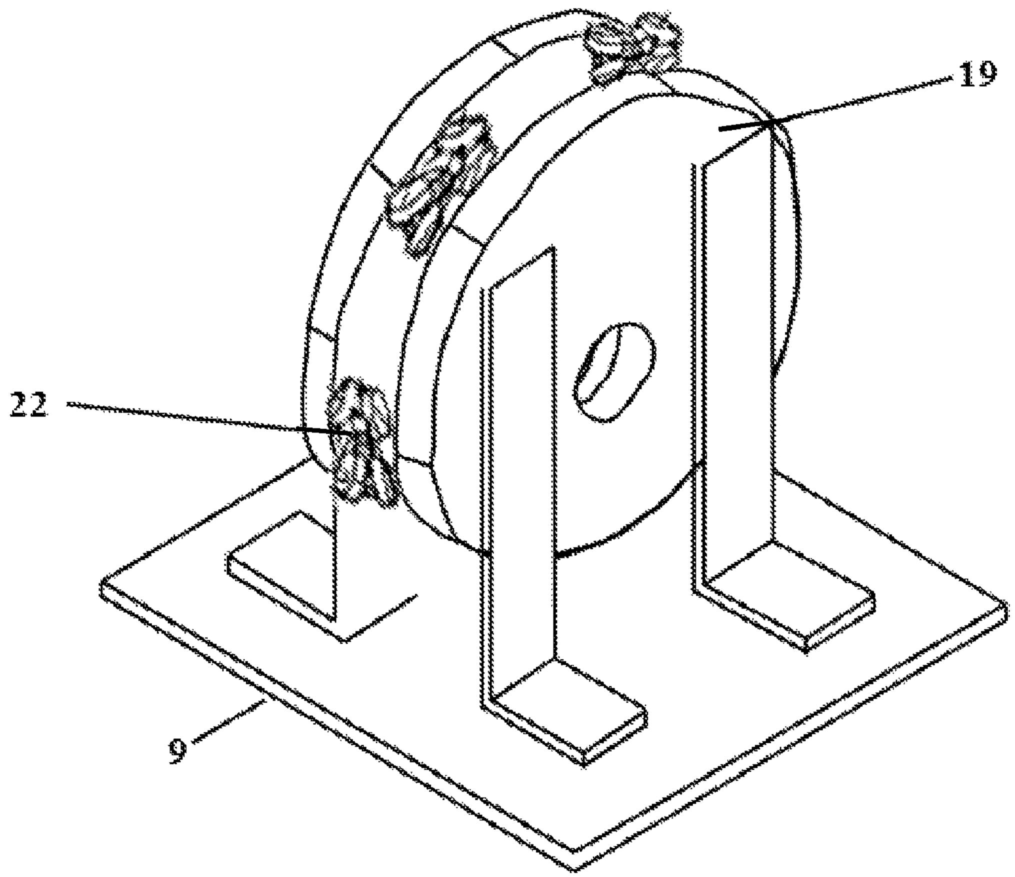
FIG. 12 shows the perspective view of the pieces shown in FIG. 11 as a whole embodiment assembled.

FIG. 12 shows the whole embodiment of the pieces shown in FIG. 11 mounted together and placed on a chassis (9).

Figure 13:
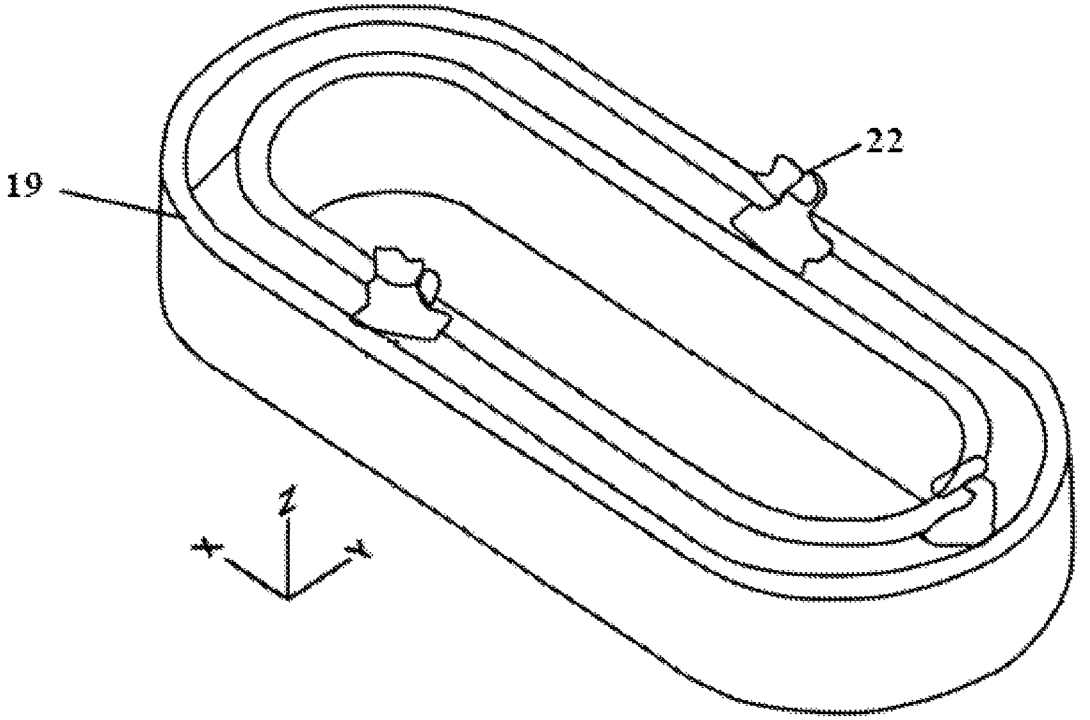
FIG. 13 shows a perspective view of the elongated looped track which has a number of masses moving independently along the looped track by way of reaction force for example jet nozzles (22).

FIG. 13 shows the elongated looped track or outer shell (19) in which the masses (15) move independently along the outer shell (19). At the beginning of the left side of the straight path of the outer shell the force which is generated by the reaction force jet nozzles (22) causes the mass to be accelerating independently along the left side of the straight path of the outer shell toward the top curve. When the mass moves along the top curve part of the outer shell, the mass exerts a force (centrifugal force) to the outer shell, thereby vibrating the outer shell. Once the mass passes top curve of the outer shell the reaction force jet nozzles rotates 180 degrees around the axis perpendicular to the mass by means of an electric motor or other means which makes the mass to decelerate independently along the right side of the straight path of the outer shell.

When the mass reached the bottom curve of the outer shell its velocity is minimized again by rotating the reaction force jet nozzles 180 degrees, and by applying minimum force level to the mass by adjusting the magnitude of the force generated by the reaction force jet nozzles the mass goes through the bottom curve of the outer shell with an insignificant force applied to the bottom part of the outer shell to achieve a unidirectional force. The cycle as described above continues in order to achieve the vibration.

Figure 14:
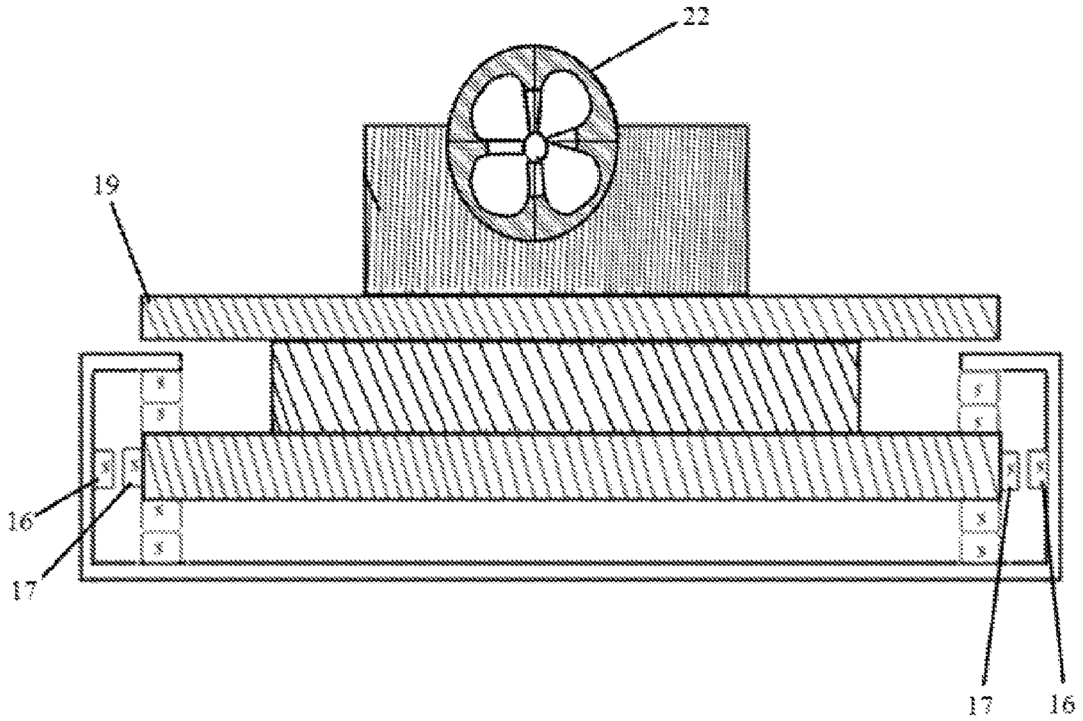
FIG. 14 shows the cross section of the looped track which holds the masses in position by means of plurality of magnets.

FIG. 14 shows the cross sectional view of the outer shell (19) and mass (15), wherein the coils or magnets (16) and (17) are attached to the outer shell and mass.

By using same polarity, repelling force is generated and by placing these magnets in configuration best shown in FIG. 14 the mass will be air cushioned and free of friction with the outer shell. The magnets or coils are placed in such a way as shown to create balanced repelling forces as to keep the mass in position at Y and Z axis (best shown in FIGS. 13 and 14) with the outer shell. The mass is free to move (slip) in the X axis along the outer shell in both straight and curved path.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

I claim:

1. An apparatus for vibrating an object comprising:

a base (9);

at least one outer shell (19) wherein said outer shell comprises at least one looped track wherein said looped track comprises a path and a surface;

at least one mass (15);

at least one jet nuzzle wherein said at least one jet nuzzle is attached to said at least one mass and wherein said jet nuzzle releases a predetermined amount of reaction force to move said at least one mass independently along the path of said at least one looped track;

a first plurality of magnets (16) wherein said plurality of magnets are attached to said at least one mass;

a second plurality of magnets wherein said second plurality of magnets are placed at said surface of said at least one looped track (17), wherein said at least one mass travels along the path of said at least one looped track by reaction force generated by said at least one jet nuzzle, where physical contact between said mass and said surface of said looped track is eliminated.

2. A method for vibrating an object comprising steps of:

a) obtaining a reaction force having a first direction and a second direction wherein said reaction force is generated by at least one jet nozzle having a predetermined level of input energy, wherein said at least one jet nozzle is attached to at least one mass, and wherein said reaction force causes said at least one mass to travel along a path on a looped track;

b) placing a plurality of magnets inside an outer shell along the path on said looped track;

c) attaching a plurality of magnets to said at least one mass, wherein said mass travels along the path on said looped track or inside of said outer shell by said reaction force generated by said jet nozzles, wherein a physical contact between said mass and an inside surface of said looped track is eliminated due to a magnetic field generated by said plurality of magnets;

d) controlling a direction of said reaction force by rotating said at least one jet nozzle (22) around an axis perpendicular to said masses (15);

e) controlling magnitude of said reaction force by adjusting said predetermined level of input energy;

f) applying said reaction force to said at least one mass, where the reaction force is applied to said masses independent of said outer shell which is positioned by using magnetism and keeping said masses (15) air cushioned and free of friction with said looped track or outer shell (19) in a desired position by engraving said outer shell (19);

g) producing centrifugal force wherein said centrifugal force comprises positive force and negative force, wherein said centrifugal force which vibrates the object is achieved by monitoring said masses positioned along the outer shell (19) and controlling the magnitude and direction of said reaction force applied to said masses (15) via a central processing unit;

h) eliminating said negative force by applying a linear motion to a rotating device thereby inverting said negative force of said centrifugal force to said positive force; and i) repeating steps a, d, e, f, g and h to vibrate said object.

* * * * *